United States Patent
Erskine et al.

(10) Patent No.: US 10,222,296 B2
(45) Date of Patent: Mar. 5, 2019

(54) OBTAINING DATA CONCERNING FACTORS INFLUENCING A RESIDUAL LIFE OF A BEARING

(71) Applicant: AKTIEBOLAGET SKF, Göteborg (SE)

(72) Inventors: Joseph Erskine, Falkirk (GB); Allan Thomson, Lanark (GB); Andrew Campbell, East Kilbride (GB)

(73) Assignee: Aktiebolaget SKF, Göteborg (SE)

( * ) Notice: Subject to any disclaimer, the term of this patent is extended or adjusted under 35 U.S.C. 154(b) by 50 days.

(21) Appl. No.: 14/911,278

(22) PCT Filed: Sep. 13, 2013

(86) PCT No.: PCT/EP2013/068988
§ 371 (c)(1),
(2) Date: Feb. 10, 2016

(87) PCT Pub. No.: WO2015/036030
PCT Pub. Date: Mar. 19, 2015

(65) Prior Publication Data
US 2016/0195453 A1  Jul. 7, 2016

(51) Int. Cl.
*G01M 13/04*  (2006.01)
(52) U.S. Cl.
CPC ................. *G01M 13/04* (2013.01)
(58) Field of Classification Search
CPC ..................... G01M 13/04; G01M 13/045
See application file for complete search history.

(56) References Cited

U.S. PATENT DOCUMENTS

| | | | | |
|---|---|---|---|---|
| 4,237,454 A * | 12/1980 | Meyer | ........... | G01H 1/003 310/323.21 |
| 5,992,237 A * | 11/1999 | McCarty | ........... | F16C 19/52 702/56 |
| 6,006,164 A * | 12/1999 | McCarty | ........... | G01D 9/005 702/182 |
| 6,202,491 B1 * | 3/2001 | McCarty | ........... | G01D 9/005 702/56 |
| 6,259,372 B1 * | 7/2001 | Taranowski | ........... | G08C 17/02 340/539.1 |
| 6,321,602 B1 * | 11/2001 | Ben-Romdhane | ........... | F16C 19/52 340/679 |
| 6,513,386 B2 | 2/2003 | Barclay et al. | | |
| 6,926,445 B2 * | 8/2005 | Sato | ........... | D21G 1/0226 374/E13.01 |

(Continued)

FOREIGN PATENT DOCUMENTS

| | | |
|---|---|---|
| CN | 101995433 A | 3/2011 |
| CN | 103063433 A | 4/2013 |
| WO | 0025101 A1 | 5/2000 |

*Primary Examiner* — David J Bolduc
(74) *Attorney, Agent, or Firm* — Bryan Peckjian; SKF USA Inc. Patent Dept.

(57) ABSTRACT

A device for monitoring a bearing, wherein the device comprises at least one sensor configured to obtain data concerning at least one of the factors that influences the residual life of the bearing. The device is a portable device and comprises a non-permanent attachment feature configured to non-permanently attach the device to a surface of the bearing so that at least a part of the at least one sensor is pressed against the surface of the bearing.

10 Claims, 2 Drawing Sheets

(56) References Cited

U.S. PATENT DOCUMENTS

| | | | | |
|---|---|---|---|---|
| 7,097,351 | B2* | 8/2006 | Lancon | G01M 13/028 |
| | | | | 374/141 |
| 7,167,814 | B2* | 1/2007 | Lindberg | G01H 1/003 |
| | | | | 702/182 |
| 2002/0000126 | A1* | 1/2002 | Barclay | G01M 13/028 |
| | | | | 73/649 |
| 2003/0030565 | A1* | 2/2003 | Sakatani | G01H 1/003 |
| | | | | 340/679 |
| 2003/0091253 | A1* | 5/2003 | Morita | B61F 15/20 |
| | | | | 384/448 |
| 2003/0173844 | A1* | 9/2003 | Iwamoto | F16C 9/02 |
| | | | | 310/90 |
| 2005/0049801 | A1* | 3/2005 | Lindberg | G01D 18/008 |
| | | | | 702/34 |
| 2008/0234964 | A1* | 9/2008 | Miyasaka | G01H 1/003 |
| | | | | 702/113 |
| 2012/0169166 | A1* | 7/2012 | Rink | F16C 41/004 |
| | | | | 310/90 |
| 2012/0239716 | A1* | 9/2012 | Murray | G01M 13/04 |
| | | | | 708/160 |

* cited by examiner

OBTAINING DATA CONCERNING FACTORS INFLUENCING A RESIDUAL LIFE OF A BEARING

CROSS REFERENCE TO RELATED APPLICATION

This is a United States National Stage Application claiming the benefit of International Application Number PCT/EP2013/068988 filed on 13 Sep. 2013, which is incorporated herein by reference in its entirety.

TECHNICAL FIELD

The present invention concerns a device, method and computer program product for monitoring a bearing.

BACKGROUND OF THE INVENTION

Rolling-element bearings are often used in critical applications, wherein their failure in service would result in significant commercial loss to the end-user. It is therefore important to be able to monitor a bearing so that the residual life of a bearing may be predicted in order to plan intervention in a way that avoids failure in service, while minimizing the losses that may arise from taking the machinery in question out of service to replace the bearing.

The residual life of a rolling-element bearing is generally determined by fatigue of the operating surfaces as a result of repeated stresses in operational use. Fatigue failure of a rolling element bearing results from progressive flaking or pitting of the surfaces of the rolling elements and of the surfaces of the corresponding bearing races. The flaking and pitting may cause seizure of one or more of the rolling elements, which in turn may generate excessive heat, pressure and friction.

In order to improve maintenance planning, it is common practice to monitor the values of physical quantities related to vibrations and temperature to which a bearing is subjected in operational use, so as to be able to detect the first signs of impending failure. This monitoring is often referred to as "condition monitoring".

Condition monitoring brings various benefits. A first benefit is that a user is warned of deterioration in the condition of the bearing in a controlled way, thus minimizing the commercial impact. A second benefit is that condition monitoring helps to identify poor installation or poor operating practices, e.g., misalignment, imbalance, high vibration, etc., which will reduce the residual life of the bearing if left uncorrected.

Typically, individual sensors are attached to a bearing. Such individual sensors can however take up considerable space and be difficult to connect to fixed measurement equipment because the sensors may need to be mounted a rotating surface of the bearing, such as on a rotating inner ring in order to measure the vibration or temperature thereof.

SUMMARY OF THE INVENTION

An object of the invention is to provide an improved device for monitoring a bearing.

This object is achieved by a device that comprises at least one sensor configured to obtain data concerning one or more of the factors that influence the residual life of the bearing. The device is a portable device, i.e. the device is small and light enough to be carried by a person, using one hand only for example. The device comprises non-permanent attachment means configured to non-permanently (i.e. removably) attach the device to a surface of the bearing, i.e. any part of the bearing, such as a rotating or non-rotating ring, such as an inner ring or outer ring, or part of a bearing housing, so that at least a part of the at least one sensor is pressed against the surface of the bearing, i.e. the at least one part of the at least one sensor makes physical contact with a surface of the bearing to enable reliable measurements to be made. A user of the device does not therefore need to hold or press the device against the surface of the bearing while the device is in use. The device will namely remain in place until it is removed from the bearing by a user once the required data has been obtained. The device is not namely intended to remain attached to the bearing in the same position during the operational lifetime of the bearing.

Such a device may be used to monitor a plurality of different bearings and/or may be mounted in a plurality of different locations on a single bearing. A plurality of individual sensors do not thereby have to be permanently mounted on a plurality of bearings or in a plurality of different locations on a single bearing, thereby saving assembly time and costs and space requirements. Furthermore, the device according to the present invention may be used it monitor existing bearings, or to test and/or calibrate readings obtained from existing sensors that are being used to monitor a bearing. The device may thereby be used to help predict or determine when it is necessary or desirable to service, replace or refurbish (re-manufacture) a bearing or a sensor that is monitoring a bearing in a simple manner.

According to an embodiment of the invention the device comprises a transmitter configured to transmit the data wirelessly to a data collection device, a database, a laboratory, a system supervisor, or a prediction unit configured to predict the residual life of the bearing using the obtained data and a mathematical residual life predication model.

According to another embodiment of the invention the at least one sensor is configured to measure at least one of the following parameters: strain, stress, acoustic emissions, vibration, rotational speed, temperature, rotation angle position. The device according to the present invention may additionally or alternatively configured to measure other parameters.

According to a further embodiment of the invention the non-permanent attachment means are magnetic attachment means, such as permanent magnets, configured to magnetically attach the device to the bearing. The magnetic attachment means may be configured to be flush with a surface of the device whereby the device surface is arranged to be pressed against the surface of the bearing when the device is non-permanently attached to the bearing.

According to an embodiment of the invention the device comprises a data processing unit configured to process the data. The device may be configured to and/or amplify signals obtained by the at least one sensor and/or carry out any other data processing step.

According to another embodiment of the invention the device comprises memory means configured to record the data obtained by the at least one sensor electronically. A user of the device may thereby obtain data on site and then take the device containing the recorded data to another location for further analysis, such as a laboratory, a data collection device, a system supervisor, or a prediction unit configured to predict the residual life of the bearing using the recorded data and a mathematical residual life predication model.

Data concerning one or more of the factors that influence the residual life of a particular bearing may be accumulated and the bearing's history log may then be used with a mathematical residual life prediction model to predict the residual life thereof at any point in its life-cycle. The residual life prediction may be updated at any subsequent point in its life cycle as more data is accumulated.

Data may be obtained using a device according to the present invention during a bearing's manufacture, after the bearing's manufacture and before the bearing's use, for testing, and/or during the bearing's use. A complete history log of a bearing may thereby be created. Accordingly, as a result of having residual life data accumulated over the bearing's life, starting with its very manufacturing all the way up to the present, a more accurate prediction can be made regarding the residual life of the individual bearing at any point in its life-cycle. Depending on the specific mathematical life-cycle model applied, an end-user may be notified of relevant facts including the time at which it is advisable to replace or refurbish the bearing.

According to a further embodiment of the invention the device comprises display means, whereby data obtained by the at least one sensor and/or processed and/or recorded by the device may be shown to a user of the device.

According to an embodiment of the invention the device is configured to be powered by at least one battery.

Additionally or alternatively the device may be configured to be powered by a power source of a machine comprising the bearing, such as a power source in the rotating hub of a wind turbine. Additionally or alternatively the device may be configured to be powered by electricity generated by the motion of the bearing. The use of such power source using means or power generation means ensures that no cables or batteries are required to power the device. It should be noted that the expression "to power the device" is intended to mean powering at least one sensor in the device and/or any other power-requiring components in the device completely or only in part.

According to another embodiment of the invention the device comprises at least one of the following: a sensor a friction strain gauge, a piezoelectric displacement beam sensor, a piezoelectric film sensor, a sensor capable of measuring strain signals, i.e. any suitable sensor technology may be used to measure strain signals.

According to a further embodiment of the invention the device comprises pressurizing means, such as at least one spring, configured to press the part of the at least one sensor against the surface of the bearing when the device is in use.

According to an embodiment of the invention the bearing is a rolling element bearing. The rolling bearing may however be any type of bearing, such as a cylindrical roller bearing, a spherical roller bearing, a toroidal roller bearing, a taper roller bearing, a conical roller bearing or a needle roller bearing.

The present invention also concerns a method for monitoring a bearing, which comprises the steps of: a) non-permanently attaching a portable device comprising at least one sensor configured to obtain data concerning one or more of the factors that influence the residual life of the bearing to a surface of the bearing so that at least a part of the at least one sensor is pressed against the surface of the bearing, b) obtaining data concerning one or more of the factors that influence the residual life of the bearing, and c) removing the portable device from bearing.

A device according to any of the embodiments of the invention may be used in such a method.

According to an embodiment of the invention the method also comprises at least one of the following steps: processing the data, transmitting the data wirelessly or non-wirelessly, displaying the data, predicting/updating the residual life of the bearing. These optional steps may be carried out in any order.

The present invention further concerns a computer program product, which comprises a computer program containing computer program code means arranged to cause a computer or a processor to execute step b) of a method according to the present invention and/or any of the optional steps outlined above, stored on a computer-readable medium or a carrier wave.

The device, method and computer program product according to the present invention may be used to monitor at least one bearing used in automotive, aerospace, railroad, mining, wind, marine or metal producing applications, or in any other machine applications which require bearings with high wear resistance and/or increased fatigue and tensile strength.

BRIEF DESCRIPTION OF THE DRAWINGS

The present invention will hereinafter be further explained by means of non-limiting examples with reference to the appended schematic figures where.

It should be noted that the drawings have not necessarily been drawn to scale and that the dimensions of certain features may have been exaggerated for the sake of clarity.

Furthermore, any feature of one embodiment of the invention can be combined with any other feature of any other embodiment of the invention as long as there is no conflict.

DETAILED DESCRIPTION OF EMBODIMENTS

Figure 1:
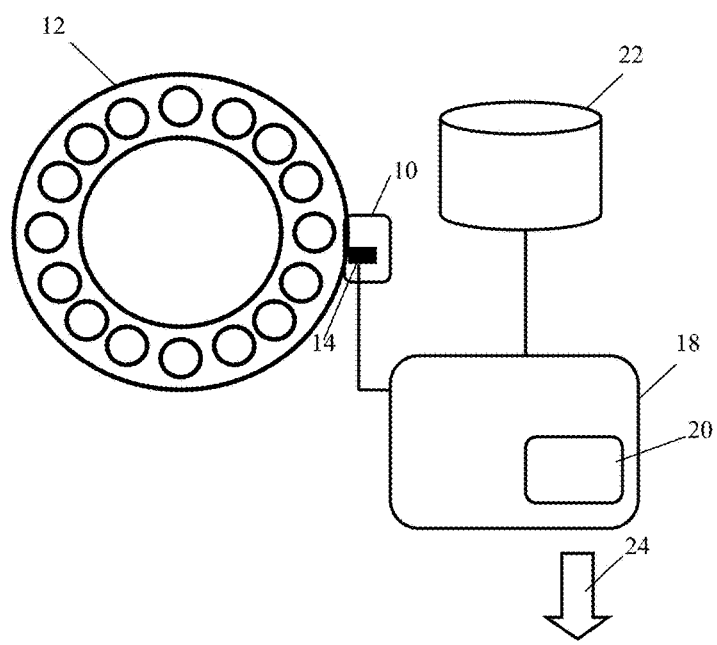
FIG. 1 shows a device according to an embodiment of the invention.

FIG. 1 shows a device 10 for monitoring a bearing 12, during its use for example. The illustrated embodiment shows a rolling element bearing 12, the device 10 according to the present invention may however be used to monitor one or more bearings 12 of any type, and not necessarily all of the same type or size. The device 10 at least one sensor 14 configured to obtain data concerning one or more of the factors that influence the residual life of the bearing 12. Rolling contact forces may for example be recorded by a strain sensor 14 located on an outer surface or side surface of the bearing's outer ring, or on an inner surface or inner side of the bearing's inner ring. Such a strain sensor 14 may be a friction strain gauge.

Additionally or alternatively the device 10 may comprise a sensor 14 for detecting high-frequency stress waves (i.e. waves with a frequency of 20 kHz-3 Mz, 100-500 kHz or higher). Vibrations or high frequency stress waves accompany the sudden displacement of small amounts of material in a very short period of time. In bearings, vibrations or high frequency stress waves can be generated when impacting, fatigue cracking, scuffing or abrasive wear occurs. The frequency of the stress waves depends on the nature and material properties of the source. An absolute motion sensor, such as an accelerometer, an acoustic emission (AE) sensor, or an ultrasonic sensor can be used to detect such vibrations or high frequency stress waves and thereby provide important information for assistance in fault detection and severity assessment. Due to the dispersion and attenuation of the vibrations or high frequency stress wave packet, it is desirable to locate a sensor as near to the initiation site as possible. A sensor 14 may therefore be placed in the vicinity of, or on the bearing inner ring or outer ring, preferably in the load zone.

Furthermore, a lubrication film can be compromised by excessive load, low viscosity of the lubricant or contamination of the lubricant with particulate material, or a lack of lubricant. If a lubrication film is compromised in this way, high frequency waves will be emitted by rolling contact of the bearing 12. The condition of the lubrication film can therefore be assessed by detecting vibrations or high-frequency stress waves that propagate through the bearing rings and the surrounding structure in the event of a breakdown of the lubrication film.

Data may be obtained periodically, substantially continuously, randomly, on request, or at any suitable time.

The device 10 is a portable device and comprises non-permanent attachment means 16 (shown in FIG. 2) which are configured to non-permanently attach the device 10 to a surface of the bearing 12 so that at least a part of the at least one sensor 14 is pressed against the surface of the bearing 10. In the illustrated embodiment, the device 10 is non-permanently attached to a rotating outer ring of the bearing 12.

The device 10 comprises a transmitter configured to transmit the data wirelessly via a communication network, such as a telecommunications network or the Internet for example. An appropriate wireless communication protocol, such as that described in IEEE802.15.4 may be used.

Data may be transmitted wirelessly or non-wirelessly to a data processing unit 18 located inside the device 10, or remotely thereto as illustrated in FIG. 1. A processing unit 18 may be configured to process or pre-processes signals received from the at least one sensor 14. The signals may be filtered, amplified, converted, compressed, re-formatted or otherwise processed so as to generate operational data representative of the magnitudes sensed.

Data may also be transmitted wirelessly or non-wirelessly to a prediction unit 20 configured to predict the residual life of a bearing 12 using obtained/recorded data and a mathematical residual life predication model. Data may be recorded in a database 22. The prediction unit 20 and the database 22 may be located inside the device 10 or at a remote location. According to an embodiment of the invention obtained, processed and/or recorded data may be sent to an end user and/or displayed on a display means of the device 10 and/or a display means located at a remote location. A device 10, data processing unit 18, a prediction unit 20, a database 22 and an end user 24 may communicate by wired or wireless means, or a combination thereof, and be located in any suitable location.

It should be noted that a data processing unit 18, a prediction unit 20, a databases 22 and/or display means need not necessarily be separate units but may be combined in any suitable manner. For example a personal computer may be used together with a device 10 to carry out a method concerning the present invention.

A device 10 according to the present invention may also comprise a receiver configured to receive data or messages from another device 10, a data processing unit 18, a prediction unit 20, a database 22 or an end user 24 for example.

The database 22 may be maintained by the manufacturer of the bearings 12. Residual life data gathered in the database 22 for a whole batch of bearings 12 enables the manufacturer to extract further information, e.g., about relationships between types or environments of usage versus rates of change of residual life, so as to further improve the service to the end-user 24.

Figure 2:
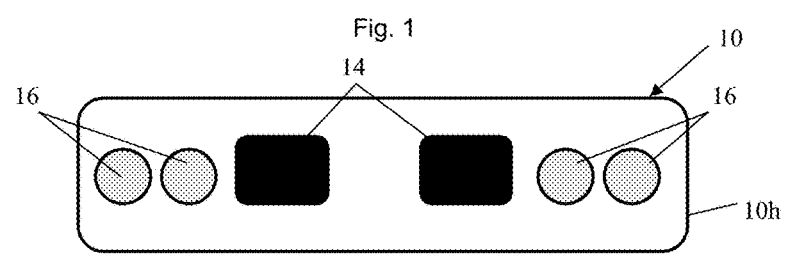
FIG. 2 shows the bottom view of a device according to an embodiment of the invention.

FIG. 2 shows the bottom of a device 10 according to an embodiment of the invention. The illustrated device 10 comprises an outer housing 10h and non-permanent attachment means 16, such as magnets, which protrude from the outer housing 10h of the device 10 and/or which are flush with the outer housing 10h of the device 10. The device 10 comprises a plurality of sensors 14, such as any combination of the following: a strain sensor, an acoustic emission (AE sensor), a temperature sensor, vibration sensor. The sensors 14 comprise at least a part the is arranged on the outside of the outer housing 10h of the device 10 or in the vicinity thereof so that it can be pressed against a surface of a bearing 12 to which the device 10 is attached to enable reliable measurements to be made. A part of the at least one sensor 14 may be pressed against a surface of a bearing before or after the device 10 has been non-permanently attached to a surface of the bearing 12 or during the attachment.

Figure 3:
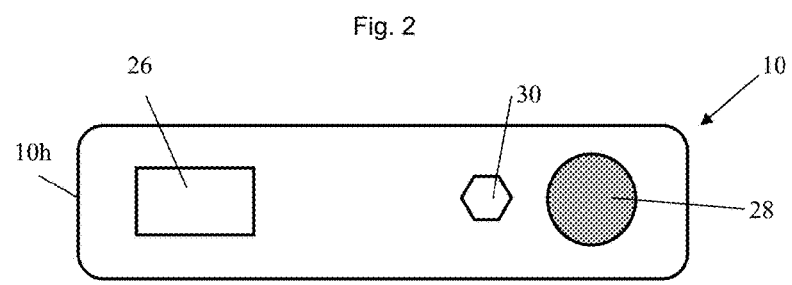
FIG. 3 shows the top view of a device according to an embodiment of the invention.

FIG. 3 shows the top of a device 10 according to an embodiment of the invention. The illustrated device 10 comprises a power connector 26 that may be connected to an external power source such as a power source of a machine comprising the bearing 12 being monitored, in order to provide the device 10 with power. Additionally or alternatively, the device 10 may be configured to be powered by at least one battery located inside the device. Additionally or alternatively, the device 10 may configured to be powered by electricity generated by the motion of the bearing 12.

According to an embodiment of the invention the device 10 is configured to be powered by electricity generated by the motion of the bearing 12 when it is in use using at least one electromagnetic coil attached to a stationary or rotating part of the bearing 12 and providing a variable magnetic flux through the at least one electromagnetic coil. An electric current can be induced in the electromagnetic coil by moving a magnet in and out of the coil to vary the magnetic flux inside it, or by moving the coil back and forth within a magnetic field.

According to another embodiment of the invention the device 10 is configured to be powered by electricity generated by the motion of the bearing 12 when it is in use using a piezoelectric element attached to the bearing which generates electricity as it is deformed, the deformation being induced by deformation of the part of the bearing 12 to which it is attached. Piezoelectricity is the charge that accumulates in certain solid materials in response to applied mechanical force.

A device 10 according to the present invention may comprise one or more visual, acoustic and/or tactile means 28, to indicate that the device 10 is receiving power, that the device 10 is in use, for example obtaining, processing, recording and/or transmitting data. The illustrated device shows a light emitting diode, LED 28.

The illustrated device 10 also shows mechanical pressurizing means 30, namely a release nut or spring. A device 10 comprising a friction strain gauge, a piezoelectric displacement beam sensor, a piezoelectric film sensor or any other type of strain sensor may for example comprise such pressurizing means 30 to press a part of the strain gauge against the surface of a bearing 12 when the device 10 is in use.

It should be noted that the components of the device 10 according to an embodiment of the invention may be located on any side or part of the device 10 and that the device 10 may be of any suitable shape. As regards the size, the device 10 may have a length of 100-200 mm, a width of 30-70 mm and a height of 5-40 mm so as to ensure that it may easily be held in the hand of a user.

Figure 4:
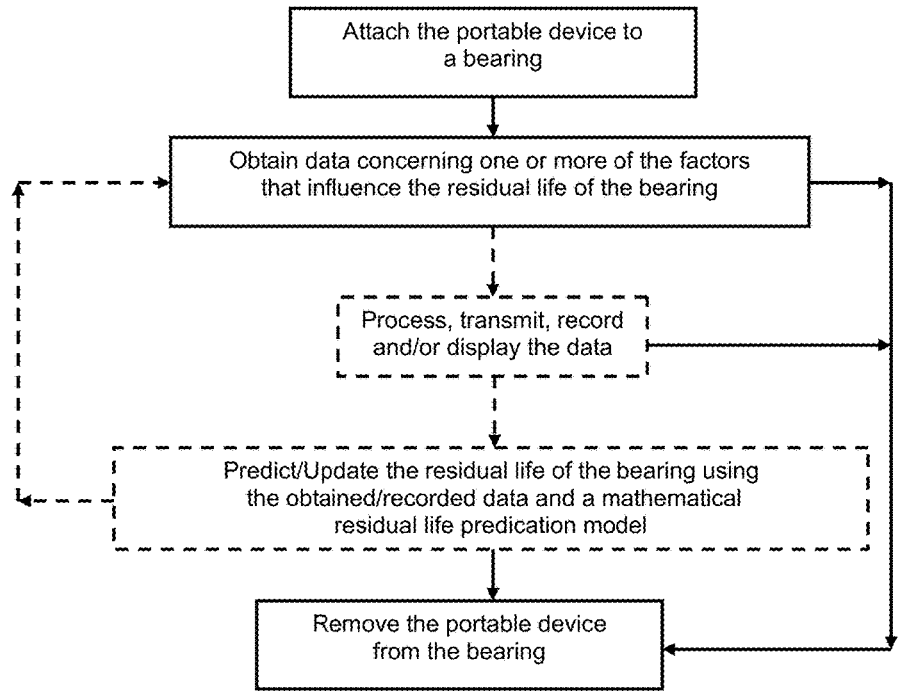
FIG. 4 is a flow diagram showing the steps of a method according to an embodiment of the invention.

FIG. 4 shows a method according to an embodiment of the invention. The method comprises the steps of a) non-permanently attaching a portable device 10 comprising at least one sensor 14 configured to obtain data concerning one or more of the factors that influence the residual life of the bearing 12 to a surface of the bearing 12 so that at least a part of the at least one sensor 14 is pressed against the surface of the bearing 12, b) obtaining data concerning one or more of the factors that influence the residual life of the bearing 12, and c) removing the portable device from the bearing 12. The device 12 may then be used to monitor another bearing or another part of the same bearing 12.

The method may optionally comprise at least one of the following steps: processing the data, transmitting the data, displaying the data, predicting/updating the residual life of the bearing.

If a prediction of the residual life of a bearing 12 is made, it may be displayed on a user interface, and/or sent to a bearing manufacturer and/or a database 22. Notification of when it is advisable to service, replace or refurbish one or more bearings 12 being monitored by the device 10 may be made in any suitable manner, such as via a communication network, via an e-mail or telephone call, a letter, facsimile, alarm signal, or a visiting representative of the manufacturer.

The prediction of the residual life of a bearing 12 may be used to inform a user of when he/she should replace the bearing 12. Intervention to replace the bearing 12 is justified, when the cost of intervention (including labour, material and loss of, for example, plant output) is justified by the reduction in the risk cost implicit in continued operation. The risk cost may be calculated as the product of the probability of failure in service on the one hand, and the financial penalty arising from such failure in service, on the other hand.

Figure 5:
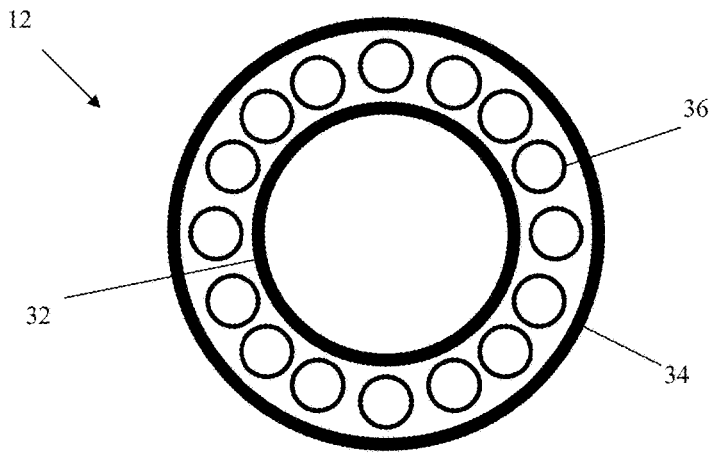
FIG. 5 shows a rolling element bearing that can be monitored using a device or method according to an embodiment of the invention.

FIG. 5 schematically shows an example of bearing 12 that can be monitored using a device or method according to an embodiment of the invention. FIG. 5 shows a rolling element bearing 12 comprising an inner ring 32, an outer ring 34 and a set of rolling elements 36. The inner ring 32 and/or outer ring 34 of a bearing 12 may be of any size and have any load-carrying capacity. An inner ring 32 and/or an outer ring 34 may for example have a diameter up to a few meters and a load-carrying capacity up to many thousands of tons.

Further modifications of the invention within the scope of the claims would be apparent to a skilled person. Even though the claims are directed to a device, method and computer program product for monitoring a bearing, such a device, method and computer program product may be used for monitoring another component of rotating machinery, such as a gear wheel.

The invention claimed is:

1. A device for monitoring a bearing, the device comprising:
    at least one sensor obtaining data in a load zone of an inner or outer ring of the bearing,
    wherein the at least one of a plurality of factors comprises data about relationships between types or environments of usage versus rates of change of the residual life;
    a data processing unit processing the data to predict and update the residual life of the bearing; and
    a non-permanent magnetic attachment component magnetically and non-permanently attaching the device to a surface of the inner or outer ring of the bearing to press at least a part of the at least one sensor against the surface of the bearing,
    wherein the device is portable and is powered by electricity generated by a motion of the bearing.

2. The device according to claim 1, further comprising a transmitter transmitting the data wirelessly.

3. The device according to claim 1, wherein the at least one sensor measures at least one of the following parameters: strain, stress, acoustic emissions, vibration, rotational speed, temperature, and rotation angle position.

4. The device according to claim 1, further comprising a memory device recording the data electronically.

5. The device according to claim 1, further comprising a display.

6. The device according to claim 1, wherein the device is powered by at least one battery.

7. The device according to claim 1, further comprising at least one of the following: a friction strain gauge, a piezoelectric displacement beam sensor, a piezoelectric film sensor, and a sensor capable of measuring strain signals.

8. The device according to claim 1, further comprising at least one spring pressing the part of the at least one sensor against the surface of the bearing when the device is in use.

9. A method for monitoring a bearing, the method comprising:
    a) magnetically and non-permanently attaching, by a magnetic attachment component, a portable device comprising at least one sensor to a surface of an inner or outer ring of the bearing to press at least a part of the at least one sensor against the surface of the bearing, the portable device being powered by electricity generated by a motion of the bearing;
    b) obtaining data in a load zone of the inner or outer ring of the bearing, the data concerning at least one of a plurality of factors that influence residual life of the bearing,
        wherein the at least one of a plurality of factors comprises data about relationships between types or environments of usage versus rates of change of the residual life;
    c) processing the data to predict and update the residual life of the bearing; and
    d) removing the portable device from the surface of the bearing.

10. A computer program product comprising computer program code stored on a non-transitory computer-readable medium, wherein the computer program code is executable by a processor of a device to cause the processor to perform:
    obtaining data in a load zone of an inner or outer ring of a bearing, by the device, the data concerning at least one of a plurality of factors that influence a residual life of the bearing, the device being powered by electricity generated by a motion of the bearing,
    wherein the at least one of a plurality of factors comprises data about relationships between types or environments of usage versus rates of change of the residual life; and
    processing the data to predict and update the residual life of the bearing.

* * * * *